United States Patent Office 3,719,393
Patented Mar. 6, 1973

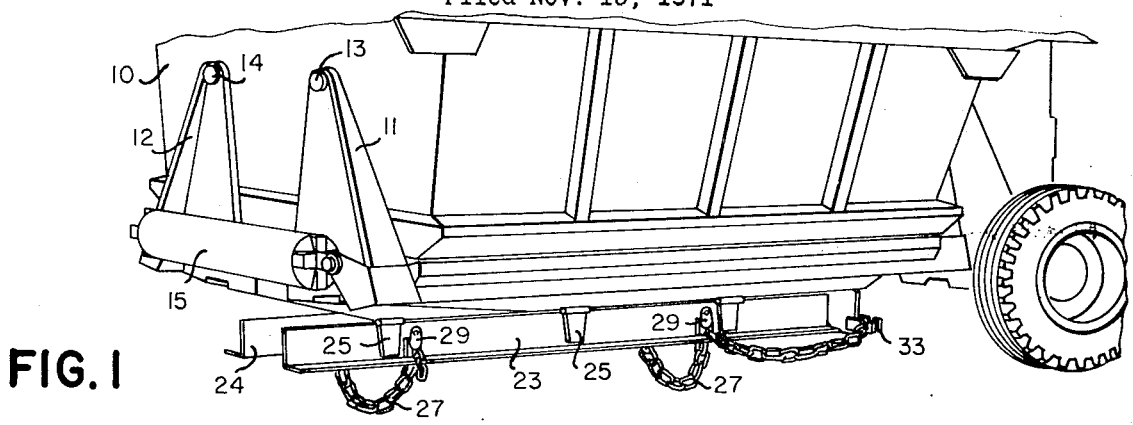
FIG. 1
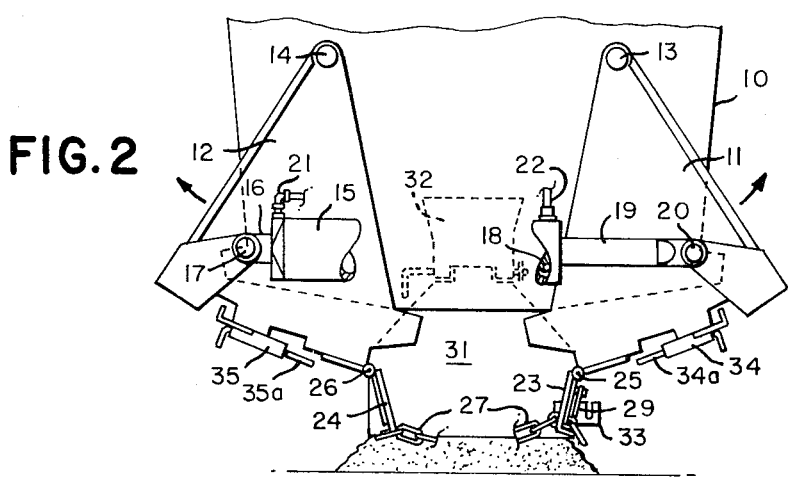
FIG. 2
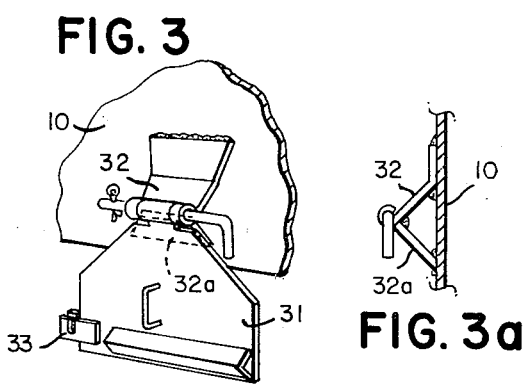
FIG. 3
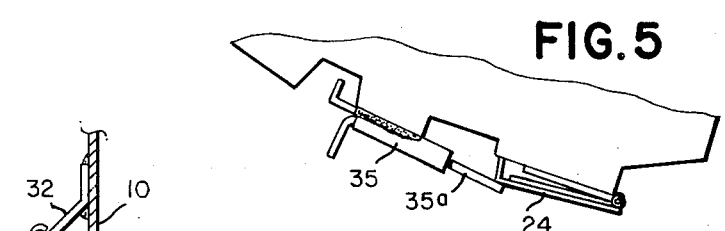
FIG. 5
FIG. 3a
FIG. 4
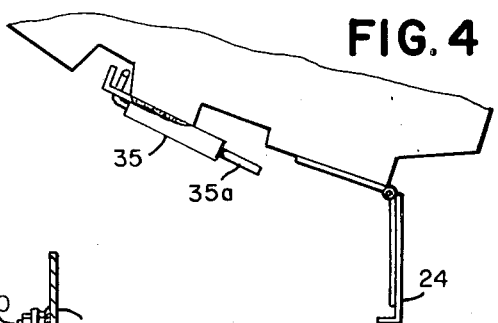
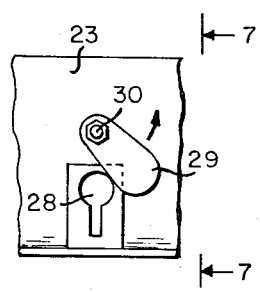
FIG. 6
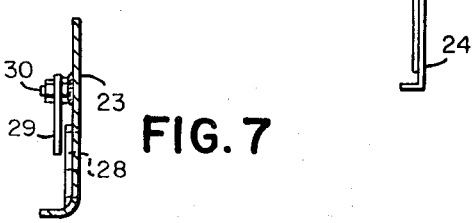
FIG. 7

3,719,393
ADJUSTABLE SPREADER AND LEVELER
FOR DUMP TRAILER
Thomas Viviano, 218 Victor Ave.,
Campbell, Calif. 95008
Filed Nov. 15, 1971, Ser. No. 198,705
Int. Cl. B60p 1/56
U.S. Cl. 298—35 M                                    5 Claims

ABSTRACT OF THE DISCLOSURE

An adjustable spreader provided to the bottom of a dump trailer to level off the material being dumped and also control the spreading thereof. The dump trailer is provided with clamshell gates with runners pivotally attached to the adjacent bottom sides thereof. Suitable chains are provided between the runners to control the spreading thereof when the clamshell gate members are open. Means is also provided to the bottom of the clamshell gates for holding the runners in elevated position when not in use. A leveling plate is attached to the rear of the trailer hopper and this plate extends across the rear ends of the runners so that it functions to level off the material dumped from the hopper as the trailer is moved forward.

DESCRIPTION OF THE INVENTION

This invention relates to a device attached to the bottom of the clamshell gate members of a trailer hopper to control the spreading and leveling of the material being dumped from the hopper.

An object of this invention is to provide an improved spreading and leveling device that may be readily attached to the bottom of a dump trailer hopper.

Another object of this invention is to provide an adjustable and retractable device to the bottom of the dump trailer hopper to control the spreading and leveling of the material being dumped from the hopper.

Still another object of this invention is to provide a pair of runners pivotally attached to the adjacent bottom parts of the clamshell gate members of a dump trailer hopper, said runners being held in vertical position along the sides of the opening between the clamshell gate members to control the spreading of the material being dumped from the hopper.

Still another object of this invention is to provide runner members to the bottom of clamshell gate members of a dump trailer hopper and a leveling gate at the rear ends of the runner members, said runners controlling the spreading of the material being dumped from the hopper and said rear gate leveling the said material as the trailer hopper is moved forward.

Other and further objects of this invention will be apparent to those skilled in the art to which it relates from the following specification, claims and drawing.

In accordance with this invention there is provided a spreading and leveling control device to dump trailers constructed so that it may be economically and efficiently manufactured and furnish reliable service. This device is adapted for use with conventional dump trailers that are provided with clamshell gate members which control the release of material from the trailer hopper. Elongated runners are pivotally attached to the adjacent edges of the clamshell gate members so that when these members are spread apart during the dumping operation the runners are vertically suspended from said adjacent edges to control the spreading of material being dumped. Chains are provided between the runners to restrain them from spreading beyond a predetermined distance. The runners are also adapted to be retracted and latched to the under-sides of the clamshell gate members when not in use. When the material carried by the trailer is being dumped therefrom through the open clamshell gate members, the runners are suspended vertically along the sides of the opening between the clamshell gate members as described above and at the same time a leveling member which is pivotally attached to the rear of the dump trailer hopper is swung down so that it extends across the rear ends of the runners and levels off the top of the material being dumped as the trailer is moved forward.

Additional features and details of this invention are set forth in the following specification, claims and drawing in which, briefly:

FIG. 1 is a fragmentary view of a dump trailer showing the front and a side thereof, the bottom of the trailer being provided with the spreading and leveling control device of this invention;

FIG. 2 is a rear view of the trailer partially broken away showing the clamshell gate members open and the side runners controlling the spreading of the material being dumped from the hopper;

FIG. 3 is a detail view of the gate at the rear of the runners employed for leveling off of the material being dumped;

FIG. 3a is a side view of the hinge supporting the gate shown in FIG. 3;

FIG. 4 is a detail view showing one of the runners suspended from the clamshell gate member to which it is pivotally attached;

FIG. 5 shows the runner shown in FIG. 4 in retracted elevated position in which it is held by the lock mechanism;

FIG. 6 is a detail of the chain lock provided to each of the runners; and

FIG. 7 is a view taken along the lines 7—7 of the chain lock mechanism shown in FIG. 6.

Referring to the drawing in detail reference numeral 10 designates the hopper of a dump trailer which is provided with two clamshell gates 11 and 12 pivotally attached thereto by the pivots 13 and 14, respectively, at one end thereof and similar pivots are provided at the other end. A cylinder 15 is provided for opening and closing the clamshell gates 11 and 12 and this cylinder is provided with a bracket 16 which is pivotally attached to the clamshell gate 12 by the pivot pin 17. The cylinder 15 is also provided with the piston 18 that is attached to the piston rod 19. The outer end of the piston rod is connected to the clamshell gate 11 by the pivot pin 20.

Cylinder 15 is also provided with couplings 21 and 22 at the respective ends thereof to which the compressed air or hydraulic supply lines leading to a control valve (not shown), are connected. Compressed air or hydraulic fluid may be supplied to either end of the cylinder for opening and closing the clamshell gates 11 and 12. Elongated runners 23 and 24 are attached to the adjacent edges of the clamshell gates 11 and 12, respectively, by the hinges 25 and 26, respectively, so that these runners may be suspended in substantially vertical positions when the gates 11 and 12 are open as shown in FIG. 2. The gravel or other material carried by the hopper 10 falls down between the runners 23 and 24 and lands on the ground below.

The runners 23 and 24 are restrained from spreading apart beyond a predetermined amount by the chains 27 and 27a attached thereto. One end of each chain is fixedly attached to the runner 24. The runner 23 is provided with apertures 28 and locking devices 29 such as shown in FIG. 6 for detachably attaching the chains to this runner. Each aperture 28 is made with a large hole through which the chain is inserted and after the desired length of chain is drawn through the aperture the chain is locked therein by inserting a selected chain link into the narrow part of the aperture. The latch 29 is pivotally attached to the runner by the bolt 30, the head of which is attached by welding or the like to runner 23, so that when the latch is turned down the enlarged portion of the aperture is closed. The chain link is retained in the narrow portion by latch 29.

When the chains 27 and 27a are locked to the runner 23, both runners 23 and 24 are prevented from swinging outward, and they are retained in their vertical positions when the gravel or other material is flowing downward therebetwen. The material being dumped is thus prevented from spreading beyond a predetermined amount. The back end of the hopper 10 is provided with a leveling plate 31 which is attached thereto by the hinge 32 and brace 32a as shown in FIGS. 3 and 3a. Leveling plate 31 is supported so that it extends across the rear ends of the runners 23 and 24 and levels off the top surface of the material being dumped from the hopper. The rear chain 27a extends out of the hole through the runner 23 and this extension is hooked on the member 33 which is attached to the plate 31. Chain 27a prevents the plate 31 from swinging to the rear from the rear ends of the runners 23 and 24 when it is leveling off the top of the material being dumped from the hopper.

The clamshell gates 11 and 12 are closed after the gravel is dumped from the hopper and the runners 23 and 24 are swung into their elevated positions. The runners are held in their elevated positions by the locking mechanisms such as shown in FIG. 5. The locking mechanisms are provided with rods 34a and 35a which are slidable in the tubular members 34 and 35, respectively, that are attached by welding or the like to the clamshell gates. Thus, when a runner is to be released the rod is retracted a short distance as shown in FIG. 4. On the other hand when the runner is to be locked in elevated position the rod is first retracted a short distance to permit the runner to be elevated up against the clamshell gate. The rod is moved into engagement with the runner to hold the runner in elevated position.

While I have shown and described a preferred form of the invention, it is apparent that the invention is capable of variation and modification from the form shown so that the scope thereof should be limited only by the proper scope of the claims appended hereto.

What I claim is:

1. In a leveling and spreading control device attached to the clamshell gate members of a dump trailer to spread and level the material dumped from the trailer as it is moved forward, the combination of elongated runners, means pivotally attaching said runners to adjacent edges of the clamshell gate members so that said runners are suspended from said adjacent edges by said attaching means when said clamshell gate members are spread apart to dump the material carried by the dump trailer, means extending between said runners to hold said runners in substantially vertical position and control the sidewise spreading of the material being dumped, a material leveling member, means pivotally supporting said material leveling member at the rear ends of said runners and means holding said material leveling member in substantially vertical position with the bottom edge thereof at a predetermined level with respect to said runners to level off the top of the material dumped from the dump trailer as said trailer is moved forward.

2. In a leveling and spreading control device attached to the clamshell gate members of a dump trailer to spread and level the material dumped from the trailer as it is moved forward, the combination as set forth in claim 1, further characterized in that said means extending between said runners comprises at least one chain having one end thereof attached to one of said runners, and means detachably attaching said chain to the other of said runners.

3. In a beveling and spreading control device attached to the clamshell gate members of a dump trailer to spread and level the material dumped from the trailer as it is moved forward, the combination as set forth in claim 2, further characterized in that said mains detachably attaching said chain to said other runner comprises a member holding said chain in an aperture provided in said other runner.

4. In a leveling and spreading control device attached to the clamshell gate members of a dump trailer to spread and level the material dumped from the trailer as it is moved forward, the combination as set forth in claim 3, further characterized in that said chain comprises a length extending through said aperture and means attaching the portion of said chain extending through said aperture to said material leveling member.

5. In a leveling and spreading control device attached to the clamshell gate members of a dump trailer to spread and level the material dumped from the trailer as it is moved forward, the combination as set forth in claim 4, further characterized in that said leveling member comprises a plate, said last mentioned chain attaching means comprises a hook attached to said plate.

References Cited
UNITED STATES PATENTS

| | | | |
|---|---|---|---|
| 387,415 | 8/1888 | Hewlett | 298—35 R |
| 851,713 | 4/1907 | Trabue | 172—784 |
| 2,989,930 | 6/1961 | Flowers | 105—250 |
| 3,029,984 | 4/1962 | Cooper | 298—27 |
| 3,198,579 | 8/1965 | Adams | 298—35 M |
| 3,298,745 | 1/1967 | Czapiewski | 105—250 |

RICHARD J. JOHNSON, Primary Examiner

R. EISENZOPF, Assistant Examiner

U.S. Cl. X.R.

37—129, 187